United States Patent Office
3,210,422
Patented Oct. 5, 1965

3,210,422
PREPARATION OF AROMATIC IMINO-CHLORIDES
John R. Holsten and Marvin R. Lilyquist, Raleigh, N.C., assignors to Monsanto Company, a corporation of Delaware
No Drawing. Filed Dec. 7, 1962, Ser. No. 242,916
6 Claims. (Cl. 260—566)

This invention relates to the preparation of aromatic imino-chlorides. More particularly, this invention relates to the preparation of N,N'-diphenylterephthalimino-chloride and N,N'-diphenylisophthalimino-chloride.

These aromatic imino-chlorides are used as intermediates in the preparation of poly (phenylene) triazoles by the reaction of m- or p-phenylene-bis-tetrazole with N,N'-diphenylterephthalimino - chloride or N,N' - diphenylisophthalimino-chloride. The polytriazoles are polymeric materials which will withstand elevated temperatures without excessive loss of weight. In the production of heat stable fibers, it is important to proceed from polymers having a high degree of heat stability as exhibited by the polytriazoles prepared from the imino-chlorides of this invention.

N,N' - diphenylisophthalimino-chloride has been prepared by the action of thionyl chloride on N,N'-diphenylisophthalamide. A general procedure for the preparation of aromatic imino-chlorides was reported by Von Braun and W. Pinkernelle, Ber., 67B, 1218 (1934). The preparation of N,N'-diphenylterephthalimino-chloride has not been known previously.

In view of the potential use of N,N'-diphenylterephthalimino-chloride as an intermediate in the preparation of thermally stable fibers, a successful process for preparing this compound is desirable. The use of N,N'-diphenyl-terephthalimino-chloride in preparing fibers will impart excellent thermal stability to the fiber. As an example, 1,4-bis [3,4-diphenyl triazolyl-(5)] benzene, made from N,N'-diphenylterephthalimino-chloride, was found to have a melting point of 425° C. whereas 1,3-bis [3,4-diphenyl (triazoyl-(5)] benzene, made from N,N'-diphenylisophthalimino-chloride, was found to have a melting point of 244° C. Due to the position of constituents on the ring, N,N'-diphenylterephthalimino-chloride will exhibit a greater resonance stability than N,N'-diphenylisophthalimino-chloride. This greater resonance stability will in turn impart greater thermal stability.

It is an object of this invention to prepare N,N'-diphenylterephthalimino-chloride.

It is a further object of this invention to provide an improved process for the preparation of aromatic imino-chlorides giving increased yields and reducing the reaction time required.

Other objects and advantages of the present invention will become apparent from the following detailed description thereof and the appended claims.

It has been found that in the preparation of aromatic imino-chlorides by the reaction of thionyl chloride with amides derived from aromatic acids that the addition of a catalytic amount of dimethylformamide to the reaction will increase the yields of the aromatic imino-chlorides obtaining and greatly shorten the reaction time. It is believed that the more active intermediate formed from the reaction of catalytic amounts of dimethylformamide with thionyl chloride causes the better results which are obtained.

Generally, the amide derived from an aromatic acid such as N,N'-diphenylisophthalamide or N,N'-diphenyl-terephthalamide is powdered and then stirred under reflux with an excess of thionyl chloride, after a catalytic amount of dimethylformamide had been added to the mixture; e.g., approximately 0.5 ml. of dimethylformamide to about 400 ml. of thionyl chloride or 0.2–0.4 molar equivalent of amide. The mixture is stirred under reflux until all gas evolution ceases and the reaction mixture is in complete solution. This will take approximately one to one and one-half hours in the N,N'-diphenylisophthalimino-chloride preparation and about 18–24 hours in the N,N'-diphenylterephthalimino-chloride preparation. The majority of the unchanged thionyl chloride is then distilled from the system leaving only a small amount remaining to react with any subsequent moisture contamination. The residue is recrystallized from a very dry solvent (distilled from calcium hydride) usually with a hot filtration in a dry nitrogen atmosphere to remove any residual unchanged amide or any other insoluble material. The hot filtrate is cooled, filtered in a nitrogen atmosphere, and the residue obtained is dried under an oil pump vacuum.

By using the method described above, N,N'-diphenyl-isophthalimino-chloride can be obtained after only one and one-half hours reaction time in up to approximately 98.5 percent yield as compared to the approximately 90 percent yield obtained after 18 hours reaction time when not using catalytic amounts of dimethylformamide; and N,N'-diphenylterephthalimino-chloride can be obtained in up to approximately 85 percent yield as compared to approximately 40 percent yield obtained when not using dimethylformamide as a catalyst.

Although specific reference has been made to the preparation of aromatic imino-chlorides having an unsubstituted phenyl group attached to the nitrogen atom, this invention is not restricted thereto, since imino-chlorides, where the N-substitutent is an aromatic radical may be prepared by this invention. The N-substituent may be an aryl group or a substituted aryl group. Preferably, the N-substituent is a phenyl group or a substituted phenyl group such as chloro phenyl, nitro phenyl, alkyl phenyl, alkoxy phenyl, and the like. A limitation to the N-substituent is that the substituent group must not contain an "active" hydrogen atom, i.e., hydrogen attached to oxygen, nitrogen, or sulfur, due to the fact that imino-chlorides generally react rapidly with "active" hydrogen atoms. Compounds having the following formula may be prepared according to this invention:

wherein R is an aromatic radical, being the same in each case. In order to prepare aromatic imino-chlorides having an N-substituent other than an unsubstituted phenyl group, the procedure would be the same as given in the detailed description above except that the amide corresponding to the desired imino-chloride would be used.

Bosshard et al., Helv. Chim. Acta, 42, 1653 (1959) reported the excellent catalytic effect of dimethylformamide in the preparation of acid chlorides from acids which did not react with thionyl chloride in the absence of a catalyst. There are a number of distinctions between the reactions of the amides described in this invention as compared to reactions of acids. In addition to the difference in electronic structure of the molecules, acids will react with amines, bases, alcohols, etc., whereas N-substituted amides generally will not undergo these reactions.

Further, there are a number of important differences between acid chlorides and the imino-chlorides of this invention. N,N'-diphenyliso- and terephthalimino-chlorides are generally more moisture sensitive than iso- and terephthalyl chlorides. Imino-chlorides react with amines to produce amidines rather than the amides produced by the reaction of acid chlorides and amines. Important in the production of fibers is the fact that acid chlorides react with 5-substituted tetrazoles to give oxadiazoles, whereas the imino-chlorides of this invention react with 5-substituted tetrazoles to give triazoles. Triazoles are generally more soluble than oxadiazoles, and therefore, fibers are more easily prepared from the triazoles than from the oxadiazoles.

The invention will be more fully described with reference to the following examples demonstrating the preparation of the aromatic imino-chlorides. These examples are intended to be illustrative only and not as limitations on the scope of the invention.

EXAMPLE 1

*Preparation of N,N'-diphenylisophthalimino-chloride.*—Sixty grams (0.19 mole) of N,N'diphenylisophthalamide and 500 ml. of freshly distilled thionyl chloride were stirred in an anhydrous system under reflux for 19 hours. The majority of the unchanged thionyl chloride was distilled from the resulting solution at atmospheric pressure. The residual thionyl chloride was removed under reduced pressure leaving a solid residue. This solid residue was dissolved in 1850 ml. of dry refluxing isooctane (distilled from calcium hydride) filtered while hot under a nitrogen atmosphere, and the filtrate cooled. The recrystallized product from the cooled filtrate was filtered free of the mother liquor in an anhydrous nitrogen atmosphere. The residue was dried in a vacuum desiccator under full oil pump vacuum. The dried residue, N,N'-diphenylisophthalimino-chloride, weighed 61.6 grams (91.9 percent of the theoretical amount) and had a melting point of 146 to 149° C. Additional recrystallization raised the melting point to 147.5–150° C.

The infrared spectrum of a sample of the imino-chloride showed the absence of any amide impurities.

EXAMPLE 2

*Preparation of N,N' - diphenylisophthalimino-chloride using dimethylformamide as a catalyst.*—Five-tenths of a ml. of dimethylformamide was added to a mixture of 79.1 grams (0.25 mole) of N,N'-diphenylisophthalamide and 200 ml. of thionyl chloride in an anhydrous reaction system. The mixture was stirred under reflux for 2.25 hours by which time gas evolution had ceased and the reaction mixture was a clear yellow solution. The majority of the unchanged thionyl chloride was distilled from the system and the residue recrystallized from 3000 ml. of dry, distilled isooctane with a hot filtration under dry nitrogen. The recrystallized product was dried in a vacuum desiccator under full oil pump vacuum leaving 86.2 grams (98 percent of theory) of N,N'-diphenylisophthalimino-chloride, M.P. 147–150° C.

EXAMPLE 3

*Preparation of N,N' - diphenylisophthalimino-chloride using dimethylformamide as a catalyst.*—Five-tenths of a ml. of dimethylformamide was added to 56.93 grams (0.18 mole) of powdered N,N'-diphenylisophthalamide and 500 ml. of thionyl chloride in a reaction flask fitted with a reflux condenser capped by a drying tube. The mixture was stirred under reflux for 1.5 hours by which time all gas evolution had ceased. The unchanged thionyl chloride was distilled from the system and the residue was dried under slightly reduced pressure. The solid residue was then recrystallized from 2200 ml. of dry isooctane distilled from calcium hydride with a hot gravity filtration in a nitrogen atmosphere. The hot filtrate was cooled and filtered in a nitrogen atmosphere. The residue was dried in a vacuum desiccator under full oil pump vacuum leaving 58.5 grams (92.1 percent of theory) of N,N' - diphenylisophthalimino - chloride, M.P. 147.0–149.0° C. The following elemental analyses were obtained on an analytically pure sample of N,N'-diphenylisophthalimino-chloride, M.P. 150.0–150.5° C., obtained by an additional recrystallization from dry isooctane:

Calcd. for $C_{20}H_{14}Cl_2N_2$: percent C, 68.00; percent H, 3.99; percent Cl, 20.08; percent N, 7.93. Found: percent C, 68.06; percent H, 4.05; percent Cl, 19.92; percent N, 8.02. Principal infrared absorption peaks for the N,N'-diphenylisophthalimino-chloride were observed to be at 6.15, 6.30, 6.75, 8.80, 9.95, 10.98, 12.12, 12.40, 13.12, 14.45, 14.60 and 14.90 microns.

EXAMPLE 4

*Preparation of N,N' - diphenylisophthalimino-chloride using dimethylformamide as a catalyst.*—Five-tenths of a ml. of dimethylformamide was added to a mixture of 56.93 grams (0.18 mole) of powdered N,N'-diphenylisophthalamide and 500 ml. of thionyl chloride in an anhydrous reaction system. The mixture was stirred under reflux for 1.5 hours, by which time all gas evolution had ceased and the reaction mixture was a clear yellow solution. The majority of the unchanged thionyl chloride was distilled from the system leaving a small residual amount of the thionyl chloride in the residue. This residue was dissolved in 220 ml. of dry refluxing isooctane, filtered hot in an anhydrous nitrogen atmosphere, and the filtrate was cooled in a refrigerator overnight. The recrystallized product from the filtrate was filtered free of the motor liquor in an anhydrous nitrogen atmosphere and combined with a similar residue prepared in a simultaneous duplicate run. The combined residue was dried under full oil pump vacuum leaving 125.0 grams (98.4 percent of the theoretical amount) of N,N'-diphenylisophthalimino-chloride, M.P. 149.0–150.4° C.

EXAMPLE 5

*Preparation of N,N' -diphenylterephthalimino - chloride.*—Fifteen grams of N,N' - diphenylterephthalamide and 245 ml. of thionyl chloride were charged to a 500-ml. reaction flask fitted with a stirrer and a reflux condenser capped by a drying tube. This mixture was stirred under reflux for 20.5 hours. The unchanged thionyl chloride was then distilled from the reaction mixture and the residue was cooled in an ice bath. This cool residue was slurried with cold hexane and filtered by gravity. The residue was recrystallized from 1750 ml. of isooctane with a hot gravity filtration in a nitrogen atmosphere. The recrystallizied product was dried in a vacuum desiccator under full oil pump vacuum. The dried residue, N,N'-diphenylterephthalimino-chloride, weighed 6.6 grams (40 percent of the theoretical amount) and had a melting point of 190–191° C.

EXAMPLE 6

*Preparation of N,N'-diphenylterephthalimino-chloride.*—A mixture of 120 grams (0.38 mole) of N,N'-diphenylterephthalamide and 1 liter of thionyl chloride was stirred under reflux for 41.5 hours. Since all of the amide was not in solution at the end of this period an additional 500 grams of thionyl chloride was added and heating was continued an additional 24 hours. The solution was not complete at the end of this period so another 500 grams of thionyl chloride was added and the mixture stirred under reflux for another 24 hours, until nearly all solids were dissolved. The unchanged thionyl chloride was then distilled from the system and the residue dried under a vacuum. Two recrystallizations were carried out using dried distilled tetrahydrofuran. Each recrystallization was accompanied by a hot gravity filtration in a dry nitrogen atmosphere. The N,N'-diphenylterephthaliminochloride obtained above was a bright yellow crystalline product having a melting point of 195° C. The following elemental analyses were obtained on the sample:

Calcd. for $C_{20}H_{14}Cl_2N_2$: percent C, 68.00; percent H, 3.99; percent Cl, 20.08; percent N, 7.93. Found: percent C, 68.11; percent H, 4.13; percent Cl, 19.63; percent N, 7.92.

The N,N'-diphenylterephthalimino-chloride was observed to have principal infrared absorption peaks at 6.1, 8.6, 10.9, 11.35, 11.8, 13.15 and 14.4 microns.

EXAMPLE 7

*Preparation of N,N'-diphenylterephthalimino-chloride using dimethylformamide as a catalyst.*—A four liter reaction flask was charged with 94.8 grams (0.3 mole) of N,N'-diphenylterephthalamide, 1200 ml. of thionyl chloride and 1.0 ml. of dimethylformamide. This mixture was stirred and heated under reflux for 22 hours. An additional 300 ml. of thionyl chloride and 0.5 ml. of dimethylformamide were added and the resulting mixture was heated under reflux for another 4.5 hours resulting in a clear yellow solution which indicated a complete conversion of amide to imino-chloride. The unchanged thionyl chloride was then distilled from the system leaving a small amount of thionyl chloride in the residue to react with any possible subsequent moisture contamination. Three liters of dry, freshly distilled tetrahydrofuran were added to the residue, and the residue was dissolved under reflux. The hot solution was filtered in a dry nitrogen atmosphere to remove undissolved impurities. The hot filtrate was cooled in an ice-brine bath and then filtered in a dry nitrogen atmosphere. The residue was dried in a vacuum desiccator under full oil pump vacuum and 90 grams (84 percent of the theoretical amount) of N,N'-diphenylterephthalimino-chloride was obtained. This residue was in the form of bright yellow crystals having a melting point of 194.0–195.0° C.

As many widely different embodiments of this invention may be made without departing from the spirit and the scope thereof, it is to be understood that the invention is not limited to the specific embodiment thereof, except as defined in the appended claims.

We claim:

1. A process for the preparation of an aromatic imino-chloride having the formula

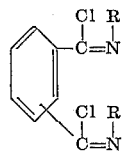

wherein R is a phenyl radical which comprises reacting an amide having the formula

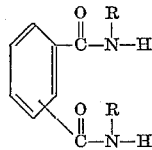

wherein R is a phenyl radical and an excess of thionyl chloride in the presence of a catalytic amount of dimethylformamide.

2. A process for the preparation of N,N'-diphenylterephthalimino-chloride which comprises reacting N,N'-diphenylterephthalamide and an excess of thionyl chloride in the presence of a catalytic amount of dimethylformamide.

3. A process for the preparation of N,N'-diphenylisophthalimino-chloride which comprises reacting N,N'-diphenylisophthalamide and an excess of thionyl chloride in the presence of a catalytic amount of dimethylformamide.

4. A process for the preparation of an aromatic imino-chloride having the formula

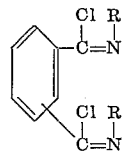

wherein R is a phenyl radical which comprises reacting an amide having the formula

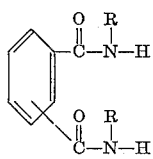

wherein R is a phenyl radical and an excess of thionyl chloride in the presence of 0.5 ml. per 0.2 to 0.4 mole of said amines of dimethylformamide and at a temperature sufficient to cause the thionyl chloride to reflux.

5. A process for the preparation of N,N'-diphenylterephthalimino-chloride which comprises reacting N,N'-diphenylterephthalamide and an excess of thionyl chloride in the presence of 0.5 ml. per 0.2 to 0.4 mole of said amides of dimethylformamide and at a temperature sufficient to cause the thionyl chloride to reflux.

6. A process for the preparation of N,N'-diphenylisophthalimino-chloride which comprises reacting N,N'-diphenylisophthalamide and an excess of thionyl chloride in the presence of 0.5 ml. per 0.2 to 0.4 mole of said amides of dimethylformamide and at a temperature sufficient to cause the thionyl chloride to reflux.

References Cited by the Examiner

FOREIGN PATENTS 581,615   8/59   Canada.

OTHER REFERENCES

Abshire et al.: C.A., volume 55, page 20487$_2$ (1961).

Bosshard et al.: Helv. Chim. Acta, volume 42, pages 1653–1658 (1959).

Braun et al.: Ber. Deut. Chem., volume 67, pages 1218–1220, 1934.

CHARLES B. PARKER, *Primary Examiner.*